US008219114B2

(12) United States Patent
Larsen

(10) Patent No.: US 8,219,114 B2
(45) Date of Patent: Jul. 10, 2012

(54) REAL-TIME LOCATION DETERMINATION FOR IN-BUILDING DISTRIBUTED ANTENNA SYSTEMS

(75) Inventor: Tormod Larsen, Geneva, IL (US)

(73) Assignee: Extenet Systems Inc., Lisle, IL (US)

( * ) Notice: Subject to any disclaimer, the term of this patent is extended or adjusted under 35 U.S.C. 154(b) by 149 days.

(21) Appl. No.: 12/772,270

(22) Filed: May 3, 2010

(65) Prior Publication Data

US 2011/0028161 A1 Feb. 3, 2011

Related U.S. Application Data

(63) Continuation of application No. 12/512,685, filed on Jul. 30, 2009.

(51) Int. Cl.
*H04W 24/00* (2009.01)
(52) U.S. Cl. ............... 455/456.1; 455/456.2; 455/404.2; 455/456.5
(58) Field of Classification Search ............... 455/404.2, 455/414.1–414.2, 456.1–456.6, 456, 67.16
See application file for complete search history.

(56) References Cited

U.S. PATENT DOCUMENTS

| | | | |
|---|---|---|---|
| 5,080,282 A | 1/1992 | Harmon | |
| 5,905,961 A | 5/1999 | Sanders et al. | |
| 6,404,886 B1 | 6/2002 | Yoshida et al. | |
| 6,515,623 B2 | 2/2003 | Johnson | |
| 6,532,416 B1 | 3/2003 | Mueller | |
| 6,781,477 B1 * | 8/2004 | Stancil | 333/125 |
| 6,928,367 B2 | 8/2005 | Gray et al. | |
| 2002/0132624 A1 | 9/2002 | Watanabe et al. | |
| 2004/0141526 A1 | 7/2004 | Balasubramanian et al. | |
| 2004/0259555 A1 | 12/2004 | Rappaport et al. | |
| 2005/0153736 A1 * | 7/2005 | Ganton | 455/553.1 |
| 2006/0019679 A1 | 1/2006 | Rappaport et al. | |
| 2006/0025158 A1 * | 2/2006 | Leblanc et al. | 455/456.2 |
| 2006/0166681 A1 | 7/2006 | Lohbihler | |
| 2006/0170565 A1 | 8/2006 | Husak et al. | |
| 2007/0063914 A1 | 3/2007 | Becker | |
| 2008/0009282 A1 | 1/2008 | Weeresinghe | |
| 2008/0233860 A1 | 9/2008 | Perry | |

OTHER PUBLICATIONS

International Search Report and written opinion in PCT/US2010/043512 mailed Sep. 16, 2010.
Office Action in U.S. Appl. No. 12/512,685 mailed Jan. 19, 2012.

\* cited by examiner

*Primary Examiner* — Erika Gary
*Assistant Examiner* — Marisol Fahnert
(74) *Attorney, Agent, or Firm* — McDonnell Boehnen Hulbert & Berghoff LLP

(57) ABSTRACT

A system for determining the location of a wireless mobile device with respect to an interconnected network of wireless transmission waveguides is disclosed. The interconnected network could be interconnected ducts of an HVAC system in a building. Multiple wireless probes are placed at multiple locations within the HVAC duct system (or similar interconnected network of waveguides). Each probe may detect a common signal from a wireless mobile device and independently preserve arrival time information of the detected signal, wherein the signal propagates to probes by way of a free-space path to an opening in one or another duct, and thereafter to the probes via one or another path through the interconnected ducts, which act as wireless transmission waveguides. By correlating timing information of a signal received at three or more probes, a location of the mobile wireless device may be determined by one or another form of triangulation.

48 Claims, 8 Drawing Sheets

(a)

702 →

| Probe No. 1 | | Probe No. 2 | |
|---|---|---|---|
| ΔT Range (μ-sec) | Distance Range (m) | ΔT Range (μ-sec) | Distance Range (m) |
| 0 - 50 | 0 - 20 | 0 - 75 | 0 - 25 |
| 50 - 100 | 15 - 40 | 75 - 150 | 20 - 60 |
| • | • | • | • |

(b)

704 →

| Sector PN 64 | | Sector PN 256 | |
|---|---|---|---|
| ΔT Range (μ-sec) | Distance Range (m) | ΔT Range (μ-sec) | Distance Range (m) |
| 0 - 40 | 0 - 18 | 0 - 65 | 0 - 38 |
| 40 - 80 | 15 - 66 | 65 - 130 | 45 - 77 |
| • | • | • | • |

706 →

(c)

| Probe No. 1 | | | Probe No. 1 | | |
|---|---|---|---|---|---|
| ΔT Range (μ-sec) | Power Level (dB) | Distance Range (m) | ΔT Range (μ-sec) | Power Level (dB) | Distance Range (m) |
| 0 - 50 | -35.0 | 15 -25 | 0 - 50 | -35.0 | 15 -25 |
|  | -34.5 | 13 - 22 |  | -34.5 | 13 - 22 |
|  | • | • |  | • | • |
|  | -8.5 | 0 - 14 |  | -8.5 | 0 - 14 |
| 50 - 100 | -35.0 | 25 -40 | 50 - 100 | -35.0 | 25 -40 |
|  | -34.5 | 20 - 38 |  | -34.5 | 20 - 38 |
| • | • | • | • | • | • |

FIG. 7

REAL-TIME LOCATION DETERMINATION FOR IN-BUILDING DISTRIBUTED ANTENNA SYSTEMS

CROSS-REFERENCE TO RELATED APPLICATIONS

This application claims priority from and is a continuation of U.S. application Ser. No. 12/512,685, which was filed on Jul. 30, 2009, and which is hereby incorporated herein in its entirety by reference.

BACKGROUND

A wireless communication system typically provides one or more forms of wireless access to mobile access devices, enabling them to engage in voice and data communications with other devices—both wired and wireless—operating in or connected to the system, and to partake in various other communication services provided or supported by the system. Cellular wireless communication systems operate according to one or more well-known CDMA or CDMA-related protocols including IS-2000, IS-856, GSM, among others. The communication path from a mobile access device, such as a cellular telephone, personal digital assistant (PDA), or an appropriately equipped portable computer, for instance, to one or more other communication endpoints generally traverses a radio frequency (RF) air interface to a base transceiver station (BTS) or other form of access point, and on into a core transport network via a base station controller (BSC) connected to a mobile switching center (MSC) or to a packet data serving node (PDSN). The MSC supports primarily circuit voice communications, providing interconnectivity with other MSCs and PSTN switches, for example. The PDSN supports packet data communications, providing interconnectivity with packet-data networks, such as the Internet, via other packet-data switches and routers.

In a cellular wireless system, the BTS, BSC, MSC, and PDSN, among possibly other components, comprise the wireless access infrastructure, also sometimes referred to as the radio access network (RAN). A RAN is usually arranged according to a hierarchical architecture, with a distribution of multiple BTSs that provide areas of coverage (e.g., cells) within a geographic region, under the control of a smaller number of BSCs, which in turn are controlled by one or a few regional (e.g., metropolitan area) MSCs. As a mobile device moves about within the wireless system, it may hand off from one cell (or other form of coverage area) to another. Handoff is usually triggered by the RAN as it monitors the operating conditions of the mobile device by way of one or more signal power levels reported by the device to the RAN.

While cellular wireless networks provide wireless access and communication services across regions spanning metropolitan areas to continents for mobile communication devices and clients, numerous smaller scale wireless access networks are deployed for much more local wireless services. Some of these may include WiFi and wireless local area networks (WLANs) for delivery of such services as wireless Internet and intranet access, thereby supporting various forms of both local and global data exchange and communications. Other smaller-scale systems for wireless-based access may be strictly local, supporting only campus or in-building applications.

Among such applications are so-called real-time location services, wherein wireless access serves largely, if not entirely, to provide and/or track locations of objects via attached devices that emit wireless identifiers or "wireless tags." Such tracking may be important for management of assets that are routinely moved between various locations within a building or campus from time to time. For example, a hospital operator may be interested in tracking the location of mobile equipment (e.g., medical monitors on wheels, etc.). By affixing a wireless tag to mobile equipment and deploying a wireless network throughout a building, the location of the asset may be tracked in real time via its wireless tag as it is relocated from one place to another. In this sense, the asset with its wireless tag may also be considered a type of wireless mobile device, albeit one whose primary purpose may not be to provide a user with mobile communication services.

As the demand for wireless services has grown, and the variety of physical environments in which wireless access is provided becomes more diverse, the need for new topologies and technologies for coverage has become increasingly important. At the same time, alternative methods of wireless access, including WiFi and WiMax, are becoming more ubiquitous, particularly in metropolitan areas. Consequently, traditional cellular service providers are looking for ways to integrate different types of wireless access infrastructures within their core transport and services networks. In addition, as wireless access infrastructures of different service providers tend to overlap more and more within smaller spaces, the ability to share common infrastructure offers cost and operational benefits to network owners and operators.

SUMMARY

A particular architectural challenge of wireless access infrastructure is to provide adequate coverage in locations where RF signals do not reach or penetrate, and on a relatively fine geographic scale, using equipment that is physically unobtrusive. One solution to emerge is a distributed antenna system (DAS), which subdivides and distributes the radio transmitter/receiver functionality of the BTS among a number of smaller, lower-power antenna nodes. The nodes can be deployed so as to provide coverage within underserved structures (e.g., in buildings) or over terrain where deployment of traditional cell towers is impractical or not permitted. In a typical DAS architecture, the radio and antenna subsystem of a "traditional" BTS is replaced with at DAS headend unit that splits the input RF signal into separate signal portions and routes them as digital-optical signals to small, remote antenna nodes via fiber optic or other suitable transmission links (e.g., coaxial cables). Each node then transmits only its RF signal portion. The DAS headend also receives signal portions from the remote nodes, and combines them for relay back into the network.

Wireless access coverage for native packet-based transport and services, including real-time location services, can be achieved using distributions of traditional wireless access points (e.g., those implementing IEEE 802.11-related protocols), accommodating WLAN, WiFi, WiMax, and other types of native packet data transport. Distributed wireless access points, in which one or more antennas are remotely located from a base unit in a manner similar to wireless cellular DAS systems, may also be used. In this case, a base unit plays the functional role of the DAS headend, and the remote connections are generally accommodated by coaxial cables.

While distributed antenna systems—whether deployed in cellular wireless system (e.g., CDMA), a WLAN or other native packet network, or both—can provide effective coverage within and throughout buildings, the number of antennas required may be large, and the infrastructure for supporting "backhaul" communication of signals between the antennas and the base unit (or DAS headend) can be correspondingly elaborate. An alternative approach for deploying a distributed antenna network takes advantage of the heating ventilation and air conditioning (HVAC) system that is typically integral to many (if not all) building structures.

More specifically, the interconnected ducts of an HVAC system are usually metallic, or at least mostly comprise metallic segments. Consequently, the ducts can serve as waveguides for RF radiation, thereby providing an effective means of transport and distribution of RF signals throughout the interior space of a building in which the HVAC system is deployed. Thus, the ducts of an HVAC system can act as an interconnected network of wireless transmission waveguides. Furthermore, ventilation supply and return openings at various locations in various segments of the ducts also serve as openings through which RF signals can enter and exit the duct-based waveguide network; i.e., the openings can serve as RF access points in the waveguide network. Since ventilation openings are generally widely distributed throughout a building (e.g., in every office or room), the HVAC duct system provides widespread RF access in addition to effective transport of RF signals.

By coupling the duct-based waveguide network with a wireless access system, the duct system and ventilation openings can be made to serve as a waveguide-based distributed antenna system. The coupling can be achieved in practice by locating one or more antennas of a wireless access system within one or more ducts of an HVAC system. Advantageously, the number of antennas required to achieve a given spatial extent of RF access coverage using the interconnected ducts of an HVAC system is generally significantly less than that of using antennas alone. Moreover, the economical advantage of using duct-based waveguides for wireless access and coverage is compounded by leveraging a ventilation system infrastructure that is already existing in most buildings.

Beyond the ability to provide effective wireless access coverage within a building, it is becoming increasingly important to be able to locate a wireless mobile device, such as a cellular phone, wireless computer, or an object possessing a wireless identification transmitter (e.g., an "RFID" or other form of wireless tag), within the building based on one or more RF signals received from the wireless mobile device. Real-time location-based services including asset tracking and management is just one example of the importance of location determination. Emergency response services, and enhanced communication services, to name a few, are examples of mobile communication services which rely on location determination. Location determination in a wireless communication system is typically based on some form of comparison between signals received from a wireless device by two or more base units, such as BTSs or sectors of a cellular system, or access points of a WiFi or WLAN system, for example.

However, a signal received from a wireless device by multiple antennas of a distributed antenna system (i.e., antennas connected to a single headend or base unit) is generally processed as a multipath detection, but does not easily support the types of signal comparisons used for location determination. Consequently, location determination using either multiple distributed antenna systems (i.e., multiple headends or base units) or even multiple, independent wireless access points (with integrated base units) can impose a significant increase in the already large infrastructure requirements of such systems. Therefore it would be advantageous to incorporate location determination capability into an HVAC-based distributed antenna system.

Hence, in one respect, embodiments of the present system provide a method of determining a location of a wireless mobile device with respect to an interconnected network of wireless transmission waveguides, the method comprising: receiving a wireless signal transmitted from a wireless mobile device at each of a first wireless probe at a first location within the interconnected network, a second wireless probe at a second location within the interconnected network, and a third wireless probe at a third location within the interconnected network; determining a first propagation delay of the wireless signal transmitted from the wireless mobile device to the first wireless probe, wherein the wireless signal enters the interconnected network through a first opening in a first wireless waveguide that is part of the interconnected network, and thereafter propagates to the first wireless probe along a first path within the interconnected network; determining a second propagation delay of the wireless signal transmitted from the wireless mobile device to the second wireless probe, wherein the wireless signal enters the interconnected network through a second opening in a second wireless waveguide that is part of the interconnected network, and thereafter propagates to the wireless second probe along a second path within the interconnected network; determining a third propagation delay of the wireless signal transmitted from the wireless mobile device to the third wireless probe, wherein the wireless signal enters the interconnected network through a third opening in a third wireless waveguide that is part of the interconnected network, and thereafter propagates to the third wireless probe along a third path within the interconnected network; and determining the location of the wireless mobile device with respect to the first, second, and third wireless probes using the first, second, and third propagation delays.

In another respect, embodiments of the present system provide a system for determining a location of a wireless mobile device with respect to an interconnected network of wireless transmission waveguides, the system comprising: a first wireless probe at a first location within the interconnected network, a second wireless probe at a second location within the interconnected network, and a third wireless probe at a third location within the interconnected network; means for determining a first propagation delay of a wireless signal transmitted from the wireless mobile device to the first wireless probe, wherein the wireless signal enters the interconnected network through a first opening in a first wireless waveguide that is part of the interconnected network, and thereafter propagates to the first wireless probe along a first path within the interconnected network; means for determining a second propagation delay of the wireless signal transmitted from the wireless mobile device to the second wireless probe, wherein the wireless signal enters the interconnected network through a second opening in a second wireless waveguide that is part of the interconnected network, and thereafter propagates to the wireless second probe along a second path within the interconnected network; means for determining a third propagation delay of the wireless signal transmitted from the wireless mobile device to the third wireless probe, wherein the wireless signal enters the interconnected network through a third opening in a third wireless waveguide that is part of the interconnected network, and thereafter propagates to the third wireless probe along a third path within the interconnected network; and means for determining the location of the wireless mobile device with respect to the first, second, and third wireless probes using the first, second, and third propagation delays.

In yet another respect, embodiments of the present system provide a tangible computer-readable medium having stored thereon computer-executable instructions that, if executed by the computing device, cause the computing device to perform a method comprising: determining a first propagation delay of a wireless signal transmitted from a wireless mobile device to a first wireless probe at a first location within an interconnected network of wireless transmission waveguides, wherein the wireless signal enters the interconnected network through a first opening in a first wireless waveguide that is part of the interconnected network, and thereafter propagates to the first wireless probe along a first path within the interconnected network; determining a second propagation delay of the wireless signal transmitted from the wireless mobile device to a second wireless probe at a second location within the interconnected network of wireless transmission waveguides, wherein the wireless signal enters the interconnected network through a second opening in a second wireless waveguide that is part of the interconnected network, and thereafter propagates to the second wireless probe along a second path within the interconnected network; determining a third propagation delay of the wireless signal transmitted from the wireless mobile device to a third wireless probe at a third location within the interconnected network of wireless transmission waveguides, wherein the wireless signal enters the interconnected network through a third opening in a third wireless waveguide that is part of the interconnected network, and thereafter propagates to the third wireless probe along a third path within the interconnected network; and determining the location of the wireless mobile device with respect to the first, second, and third wireless probes using the first, second, and third propagation delays.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

BRIEF DESCRIPTION OF THE DRAWINGS

FIG. 7 (a, b, and c) illustrates three examples of tables of location-related information that could be stored in and used by a computing platform for enhancing the accuracy of location determination using an HVAC-based distributed antenna system.

DETAILED DESCRIPTION

The present invention will be described by way of example with reference to wireless access technologies including Code Division Multiple Access (CDMA), UMTS, GSM, WiFi, and WiMax, although the invention is not limited to these technologies. CDMA and GSM are typically deployed in cellular wireless communication systems, and generally encompass a number of related technologies that collectively and/or individually support both circuit-cellular communications, including voice and circuit-based packet communications, and native packet-data communications. For the purposes of the discussion herein, a "CDMA family of protocols" shall be taken to apply to all such technologies. Examples of protocols in the family include, without limitation, one or more versions of IS-95, IS-2000, IS-856, and GSM, among others. Native packet-data wireless protocols and technologies, include, without limitation WiFi, WiMax, WLAN, and IEEE 802.11, some or all of which may be interrelated. The term "wireless Ethernet" is also sometimes used to describe one or another of these protocols or aspects of these protocols.

Figure 1:
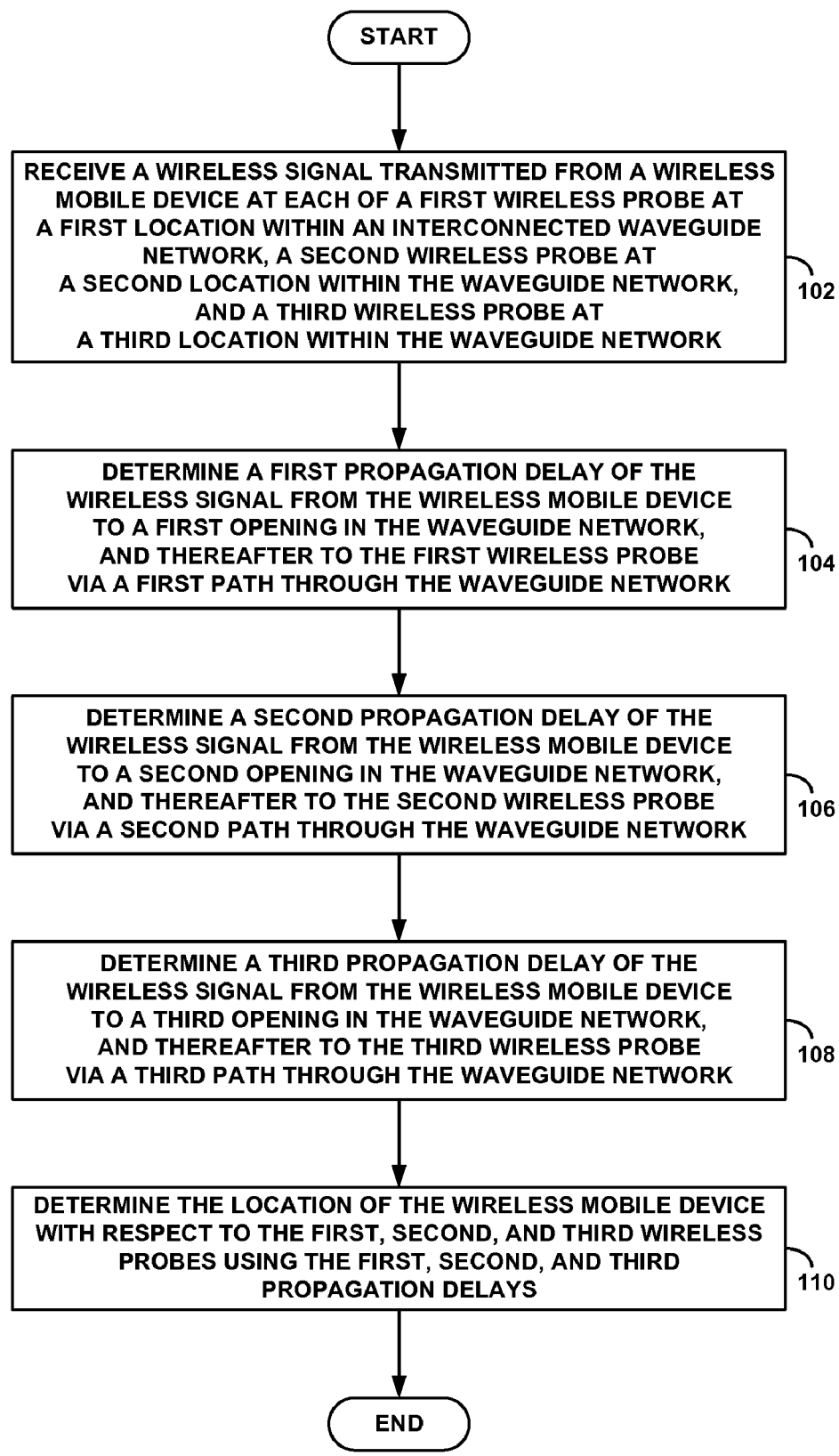
FIG. 1 is a flowchart illustrating an example embodiment of a method of location determination in relation to an interconnected network of wireless transmission waveguides.

FIG. 1 is a flowchart illustrating an example embodiment of a method of location determination with respect to an interconnected network of wireless transmission waveguides, such as the interconnected ducts of an HVAC system of a building structure. The method could be used to determine the location of a wireless mobile device (e.g., a cell phone, wirelessly-equipped computer, or object with a wirelessly-transmitted ID or wireless tag) within the building structure. The interconnected ducts of the HVAC system could comprise part of a distributed antenna system, wherein the ducts act as waveguides for transmission of RF signals, and ventilation openings (supply and/or return) act as RF access points that couple the RF signal of wireless communication devices to the waveguide network. Such a distributed antenna system could be deployed for cellular wireless communications (e.g., CDMA-based) and/or wireless Ethernet communications, or the like. As described below in more detail, a plurality of wireless probes placed within the duct system (or, more generally, in the interconnected network of wireless transmission waveguides) can be used to provide location determination by correlating timing information of signals received from a given wireless device. By way of example, the method illustrated in FIG. 1 could be performed by a computer or computing device acting on input signals received at wireless probes that are communicatively coupled with the computer or computing device, the steps of the method being carried out according to computer-executable instructions stored in one or more forms of computer-readable media and/or memory.

At step 102, a wireless signal transmitted from a wireless mobile device is received at each of a first wireless probe at a first location within the interconnected waveguide network, a second wireless probe at a second location within the interconnected waveguide network, and a third wireless probe at a third location within the interconnected waveguide network. In accordance with the example embodiment, each wireless probe comprises a wireless antenna connected to a different wireless base unit. For example, each probe could be a remote antenna associated with a different 802.11 base unit. Alternatively, each wireless probe could be a cellular RF antenna associated with a different CDMA sector implemented in a DAS headend. The antennas could be located remotely from their respective base units, or integrated with them. Other arrangements are possible as well. Because each of the three wireless probes is associated with a different base unit, the same wireless signal received at each wireless probe can be independently detected. In particular, time delay information can be determined for each of the first, second, and third wireless probes, as described below.

In further accordance with the example embodiment, the interconnected waveguide network could be the interconnected ducts of an HVAC system in a building structure. Advantageously, the interconnected ducts could provide RF transport and distribution of wireless signals to and from each wireless probe. As such, each wireless probe could provide wireless access throughout most or all of the interior space served (e.g., building) by the HVAC ventilation ducts and openings. Since each probe is associated with a different base unit, timing information they each derived from a signal from common source (i.e., the wireless mobile device) can be correlated to determine the location of that source. In particular, by appropriately choosing the first, second, and third locations for placement of the probes, timing information derived by the wireless probes can be most effectively utilized to determine source location. For example, three locations could be widely separated in the building (to an extent consistent with the architecture of the existing ducts of the HVAC system).

At step 104, a determination is made of a first propagation delay of the wireless signal transmitted from the wireless mobile device to the first wireless probe. In accordance with the placement of the first wireless probe at the first location within the interconnected ducts of the HVAC system, the wireless signal propagates along a free-space path from the wireless mobile device to a first opening in a first duct where the signal is coupled with the first duct (waveguide), and thereafter propagates along a path within the HVAC ducts to the first wireless probe. The first opening could be an air supply opening, such as an air diffuser, or an air return opening. It will be appreciated that signal propagation along the path within the HVAC duct system, from the first opening to the first wireless probe, is determined by the physics of RF transmission in a waveguide and the particular architecture of the HVAC.

In accordance with the example embodiment, the determination of the first propagation delay can be made by measuring a round-trip delay of a signal transmitted from the first wireless probe to the wireless mobile device and back. Alternatively, the wireless signal from the wireless mobile device could contain a time stamp indicating the instant in time at which the signal was transmitted from the device, and the first propagation delay could be determined as a difference between the time stamp and the time of arrival of the signal at the first wireless probe. Yet a further alternative way to determine the first propagation delay involves determining a difference in arrival times of the wireless signal at each of the first, second, and third wireless probes, as describe below in more detail.

Note that the arrival time of the first signal at the first wireless probe could actually be determined at a first base unit that is remotely located from the first probe. For instance, the first probe could be a first antenna at the first location in the HVAC duct system, while the first base unit could be situated at a different location, connected to the first antenna by a coaxial cable. In this configuration the arrival time that is measured would actually be the arrival time at the first base unit. For such a configuration, the arrival time at the first probe (i.e., the first antenna) could then be determined by subtracting a fixed propagation delay corresponding to the path through the coaxial cable between the first antenna and the first base unit. With the length of the coaxial cable known, the propagation delay along this cable would be easily determined from the speed of signal propagation (the speed of light for RF signals). Since the cable length is the same for all signals received at the first base unit from the first antenna, the fixed propagation delay represents a known correction (or adjustment) that would be applied to all signals to determine the first propagation delay between the wireless mobile device and the first wireless probe.

At step 106, a determination is made of a second propagation delay of the wireless signal transmitted from the wireless mobile device to the second wireless probe. In accordance with the placement of the second wireless probe at the second location within the interconnected ducts of the HVAC system, the wireless signal propagates along a free-space path from the wireless mobile device to a second opening in a second duct where the signal is coupled with the second duct (waveguide), and thereafter propagates along a path within the HVAC ducts to the second wireless probe. As with the first opening, the second opening could be an air supply opening, such as an air diffuser, or an air return opening. It will again be appreciated that signal propagation along the path within the HVAC duct system, from the second opening to the second wireless probe, is determined by the physics of RF transmission in a waveguide and the particular architecture of the HVAC.

In accordance, once more, with the example embodiment, the determination of the second propagation delay can be made by measuring a round-trip delay of a signal transmitted from the second wireless probe to the wireless mobile device and back. As with determination of the first propagation delay, a time stamp indicating the instant in time at which the signal was transmitted from the mobile wireless device could be used to determine the second propagation delay as a difference between the time stamp and the time of arrival of the signal at the second wireless probe. And yet again, determination of the second propagation delay could be made according to a difference in arrival times of the wireless signal at each of the first, second, and third wireless probes, as describe below in more detail.

At step 108, a determination is made of a third propagation delay of the wireless signal transmitted from the wireless mobile device to the third wireless probe. In accordance with the placement of the third wireless probe at the second location within the interconnected ducts of the HVAC system, the wireless signal propagates along a free-space path from the wireless mobile device to a third opening in a third duct where the signal is coupled with the third duct (waveguide), and thereafter propagates along a path within the HVAC ducts to the third wireless probe. As with the first and second openings, the third opening could be an air supply opening, such as an air diffuser, or an air return opening. Again, signal propagation along the path within the HVAC duct system, from the third opening to the third wireless probe, is determined by the physics of RF transmission in a waveguide and the particular architecture of the HVAC.

As with the determinations of the first and second propagation delays, the determination of the third propagation delay can be made by measuring a round-trip delay of a signal transmitted from the third wireless probe to the wireless mobile device and back. Once more, either of the two alternative methods could be used as well.

Additionally, either or both of the second and third wireless probes could be antennas that are remotely located from respective base units. As with the first wireless probe, a constant propagation delay corresponding to the distance of a fixed link (e.g., coaxial cable) between the remote antennas and their respective base units could be subtracted from propagation delays measured at the respective base units.

This correction would yield propagation delays for the wireless signal transmitted from the wireless each of the second and third probes.

As noted, the three propagation delays can be determined according to differences in arrival times of the wireless signal at each of the three wireless probes. For this approach, an arrival time of the wireless signal is determined at each of the three wireless probes, correcting (or adjusting) if necessary for any propagation delays between the wireless probes and their respective base units (e.g., for remote antenna configurations, as described above). The three arrival times can then be used to determine differences between the three arrival times, which in turn can be used to algebraically determine the three propagation delays.

At step 110, the location of the wireless mobile device is determined with respect to the first, second, and third wireless probes using the first, second, and third propagation delays. In accordance with the example embodiment, the first, second, and third propagation delays are respectively converted to first, second, and third propagation distances, which are, in turn, used to determine a triangulation region with respect to the first, second, and third wireless probes. Each of the propagation delays can be converted into a propagation distance by multiplying the delay by the propagation speed of the wireless signal (the speed of light for an RF signal). The triangulation region can then be determined by treating each propagation distance as a radial distance from the respective wireless probe, and determining the smallest region of spatial overlap of respective spheres about the wireless probes.

For strictly free-space paths from the wireless mobile device to each of three receiving probes, triangulation as described leads, in principle, to an exact, unique location. However, since at least part of each signal path from the wireless mobile device to each wireless probe includes a portion through one or more HVAC ducts or duct segments, the propagation distances based on simple conversion using only propagation delays will generally be overestimates of strictly free-space paths. Hence, triangulation using these distances will yield a region of overlap instead of an exact location. The accuracy with which the overlap region (triangulation region) isolates the true location of the wireless mobile device may depend on the architecture of the HVAC system, the locations of the wireless probes in the HVAC system, the locations of the ventilation openings in the HVAC system, and the proximity of the wireless mobile device to the particular openings that most strongly couple the wireless signal to the waveguide network (i.e. HVAC ducts).

In order to achieve a more accurate location determination, the first, second, and third propagation delays could be respectively converted to a first distance range from the first wireless probe, a second range from the second wireless probe, and third distance range from the third wireless probe. The location of the wireless mobile device could then be determined as being encompassed in a region of overlap of the first, second, and third distance ranges. In accordance with the example embodiment, a look-up table could be configured to associate each of the first, second, and third wireless probe with a respective set of ranges of propagation distances. Each range of propagation distances of each respective set of ranges could in turn be associated with a range of propagation delays. By consulting the look-up table, a given propagation delay for a given wireless probe could be identified with a particular range of propagation delays for that probe, and thereby associated with the corresponding range of propagation distances for that probe. This look up could be applied to each of the three propagation delays in order to determine the three distance ranges and the resulting, overlapping region.

While distance ranges for any given probe might not uniquely set a location with respect to that probe, three radial distances would define a region of overlap that would constrain the location of the wireless mobile device.

In further accordance with the example embodiment, the look-up table could be generated by measuring propagation time delays for a test wireless mobile device at various, known locations within the building. As such, the look-up table would advantageously be based on a set of propagation delays calibrated against known, and hence accurate, distances from each of the wireless probes. When applied to the wireless signal from the wireless mobile device of interest, the distance ranges determined from the look-up table would thereby incorporate the accuracy of the calibration.

As an added enhancement to the accuracy of the look-up table, each range of propagation distances of each respective set of distance ranges in the look-up table could further be correlated with a range of signal strengths. The range of signal strengths in the look-up table could be determined as a further calibration, using actual measurements to correlate both measured time delays and signal strengths with known distances from the wireless probes. In accordance with this enhancement, a signal strength measurement would be made by each wireless probe at the same time that the propagation delay measurement is made for the wireless signal received from the wireless mobile device. For instance, signal strength could be determined according to a reverse signal strength indicator (RSSI). Application of the look-up table could then include a correlation of both observed propagation delay and signal strength with a range of distances from each of the three wireless probes. The range of distance would again yield an overlap region within which the wireless mobile device is determined to be located. The addition of signal strength would advantageously improve the accuracy and reliability of the look-up based distance determination.

As yet an additional or alternative enhancement to the accuracy of a look-up-based location determination, a database could be used to translate each propagation delay into a specific set of spatial coordinates with respect to the wireless probes. For instance, setting a particular location in the building as the origin of a rectangular coordinate system, each set of spatial coordinates would specify the (x,y,z) location of a point with respect to the origin. The database could be pre-configured to contain correlations between measured propagation delays and specific location coordinates in the building (or otherwise with respected to the interconnected network of transmission waveguides). Then, each of the first, second, and third propagation delays could be used to respectively determine first, second, and third interpolated propagation delays based on the pre-configured, measurement-based values in the database. Each interpolated propagation delay could then be used to respectively determine first, second, and third interpolated sets of spatial coordinates, from which an overlapping region encompassing the location of the wireless mobile device could be determined.

In the discussion of FIG. 1, as well as in other discussions and explanations herein, the descriptions "first," "second," and "third" as applied to the "wireless probe," "location," "propagation delay," among other terms, are intended as identifying labels, and not meant to imply any numerical ordering (although a numerical ordering is not necessarily excluded). It will also be appreciated that the steps of FIG. 1 are shown by way of example, and that additional and/or alternative steps or alternative ordering of steps could be carried out and still remain within the scope and spirit of the present invention.

Figure 2:
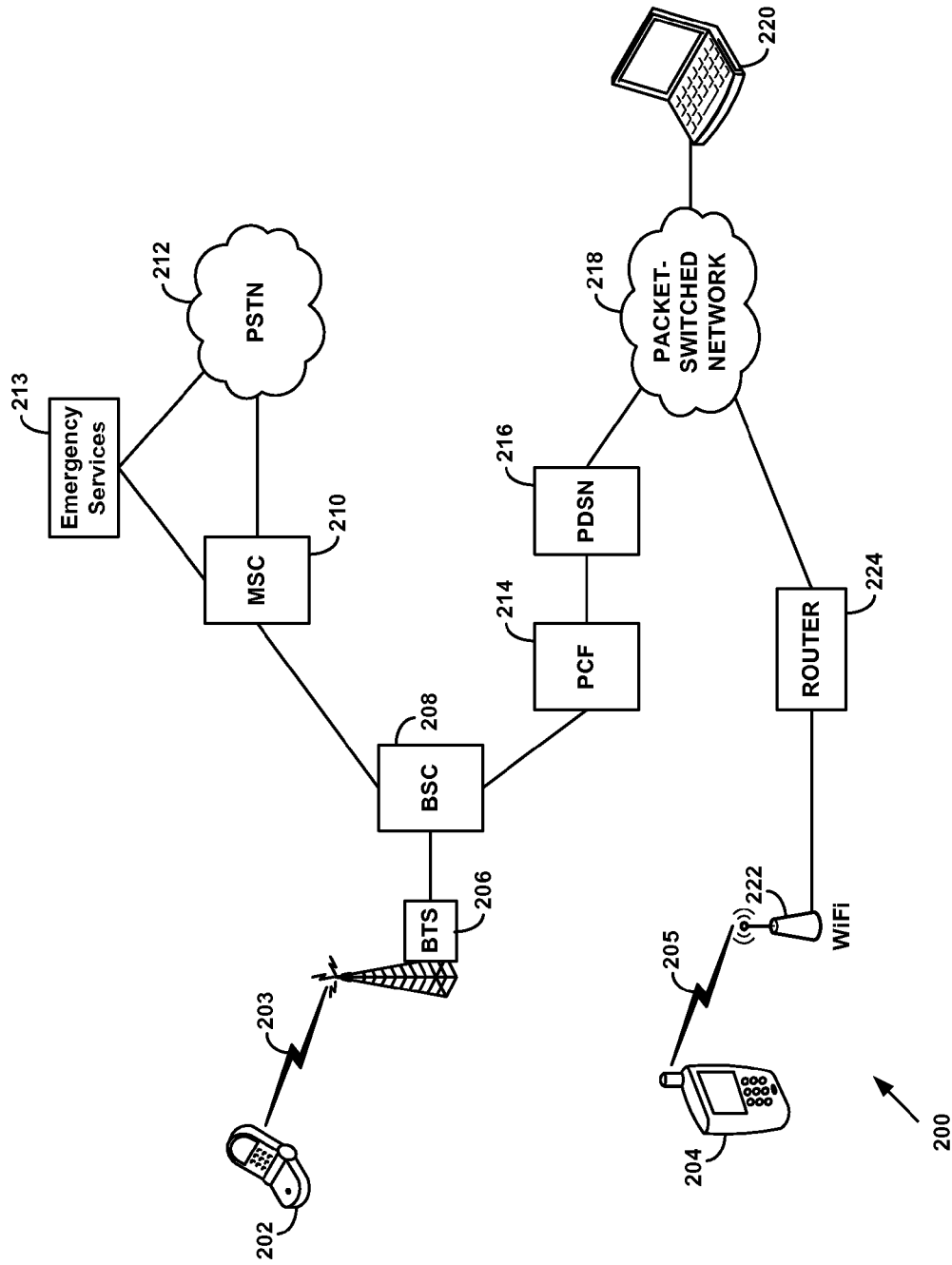
FIG. 2 illustrates an example wireless communication network for providing wireless access and services.

FIG. 2 shows an example wireless communication system that could be owned and/or operated by a service provider and in which real-time location services could be provided. The illustration depicts a high-level architectural view of network 200, but without details relating to distributed antenna systems. As such, FIG. 2 represents an example context in which one or more distributed antenna systems could be deployed for providing wireless access. In particular, when deployed for wireless access in a building or other interior structure, such a distributed antenna system could utilize the existing HVAC duct network as waveguides for transmission and distribution of wireless signals throughout the building. Real-time location determination could then be used to support in-building delivery location-based services, or communicated to the network for more geographically dispersed (e.g., metropolitan or regional) location-based services. Details of location determination in HVAC-based distributed antenna systems are discussed following the contextual description below of network 200.

A wireless access device 202 is communicatively connected to the system by way of an RF air interface 203 to a BTS 206, which in turn is connected to a BSC 208. The RF air interface 203 is defined and implemented according to one or more of a CDMA family of protocols. The BSC is connected to an MSC 210 for circuit-cellular communications, and via a packet control function (PCF) 214 to a PDSN 216 for packet data communications. The MSC is connected to a PSTN 212, thus providing a communication path to landline circuit networks. The connection to the PSTN 212 is also intended to represent trunk connections between the MSC 210 and other circuit switched, including (without limitation) local exchange switches, interexchange switches for long-distance services and interconnections with other carriers' networks, and other MSCs both in the carrier's network and other carriers' networks.

Connected to MSC 210 and PSTN 212 is a block 213 representing emergency services. In particular, this block in meant to encompass services including 911 and Enhanced 911 ("E-911"), which employ a caller's location supplied by and/or extracted from one or another network element. While details of the emergency services block 213 are omitted for the sake of brevity in FIG. 2, it will be appreciated that various functions, procedures, and protocols of E-911 service are supported by elements including one or more public safety access points (PSAPs), automatic location information (ALI) databases, and for mobile device location determination, propagation delay measurements from multiple BTSs. In particular, by combining delay measurements for three or more BTSs, location can be determined by triangulation according to protocols including advanced forward link triangulation (AFLT). As describe in more detail below, distributed antenna systems based on HVAC duct systems can be adapted to support existing AFLT-based methods of mobile device location determination for in-building delivery of E-911 and other emergency services.

Continuing with the description of network 200, the PDSN 216 is connected to a packet-switched network 218, which could be the Internet or a core packet transport network that is part of the wireless communication system. A computer 220 is also shown being connected to the packet network 218, and the wireless device 202 could engage in communications with the computer 220 via a path such as the one just described. It will be appreciated that, although not shown, other communication devices, as well as communication and application servers could be connected in one way or another to the network 218. In addition, the network 118 may comprise other equipment including, without limitation, routers, switches, transcoding gateways, security gateways and firewalls, and other components typical of a communication and transport network.

Also shown in FIG. 2 is a second wireless access device 204, which is connected to the wireless communication system via the air interface 205 to a WiFi access point 222. The access point is in turn connected to an out 224, which then connects to network 218. Although not shown for the sake of brevity, it will be appreciated that this connection could include other packet routing/processing elements. The access device 204 could also engage in communications with one or more communication endpoints via the physical path shown in the figure. The detailed protocols and methods for establishing communications between either of the devices 202 or 204 and other devices and communication endpoints in the network are well-known, and therefore not discussed further herein.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as the system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device, such as the example access devices 202 and 204, typically comprises a user-interface, I/O components, a communication interface, a tone detector, a processing unit, and data storage, all of which may be coupled together by a system bus or other mechanism.

1. In-Building Wireless Access

Providing cellular wireless access in buildings, such as office buildings, apartment buildings, skyscrapers, and the like, can pose challenges because BTS coverage may not efficiently penetrate the interior of some structures. Many of the challenges apply to wireless access for WLAN and the like, as well. As discussed above, the challenges can be addressed using traditional distributed antenna systems, with a relatively high multiplicity of antennas, or HVAC-based systems, in which existing ventilation ducts serve as RF waveguides. Both approaches are described in more detail below.

a. High-Multiplicity Deployment of Access Points and/or Antennas

Figure 3:
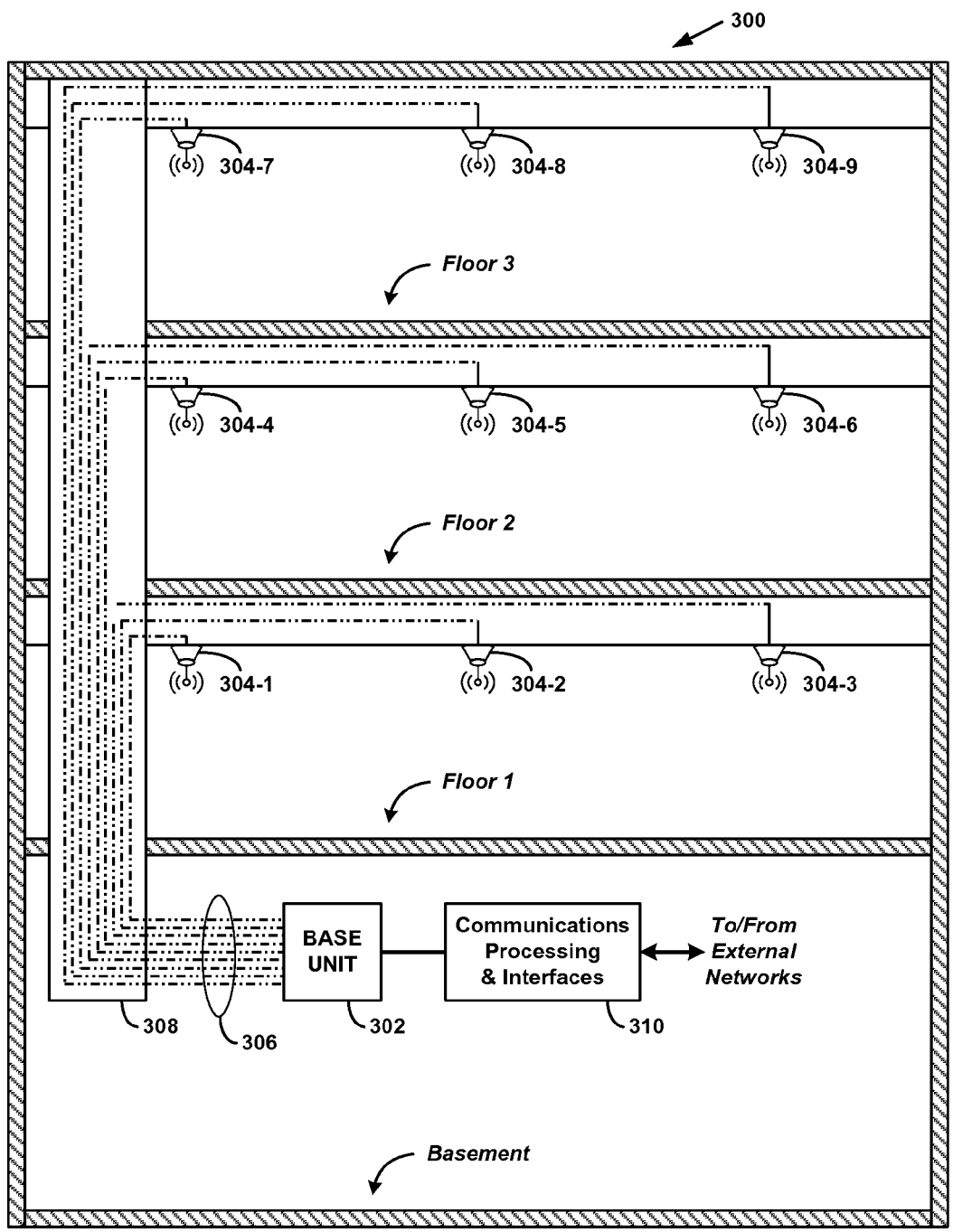
FIG. 3 illustrates in-building wireless access using a high-multiplicity deployment of distributed antennas.

FIG. 3 illustrates a traditional distributed antenna system using a high multiplicity of antennas to achieve widespread RF coverage throughout the interior space of a building. With regard to achieving coverage, the principle of deploying multiple antennas of a DAS to provide cellular wireless coverage throughout a building is similar to deploying multiple, distributed antennas connected to a base unit of a wireless access system (e.g., WLAN), or even deploying multiple wireless access points (i.e., integrated antenna and base unit). Hence the discussion of FIG. 3 applies to any of these situations with respect to the issues of RF coverage.

By way of example, a building 300 is depicted in a cut-away view in FIG. 3 as having three floors and a basement, as labeled. Three remote antennas are located at the ceiling of each of the three floors, for a total of nine antennas throughout the building: antennas 304-1, 304-2, 304-3 covering the first floor, antennas 304-4, 304-5, 304-6 covering the second floor, and antennas 304-7, 304-8, 304-9 covering the third floor. Each antenna is connected to a base unit 302 in the basement via one of a set 306 of nine cables (e.g., coaxial cables). A conduit 308 provides physical routing for the cables from their respective antennas to the base unit. The base unit is connected to platform 310 that provides communications processing and interfaces for communication to and from external networks, such as network 200 in FIG. 2. It will be appreciated that platform 310 could actually be implemented as more than one physical platform, and could include functions such as routing, switching, and application hosting.

As noted the base unit could be a DAS headend and the cables could be fiber optic connections. Alternatively, the base unit could be or a wireless access point base station, and the cables could be coaxial transmission cables. For WLAN or WiFi coverage, some or all of the antennas could be integrated access points, the base unit could be a router or an Ethernet switch, and the cable could be Ethernet cables (e.g., category 5 cables).

The nine antennas depicted in FIG. 3 are meant to represent a high multiplicity deployment. In practice, coverage in a large building may require many more than nine antennas. As the number of antennas increases, the infrastructure requirements, including cabling and conduits, grows as well. Depending on the size of the building and the physical layout of the interior space, the complexity of such a deployment can therefore be significant.

b. HVAC Distribution of RF Signals

Figure 4:
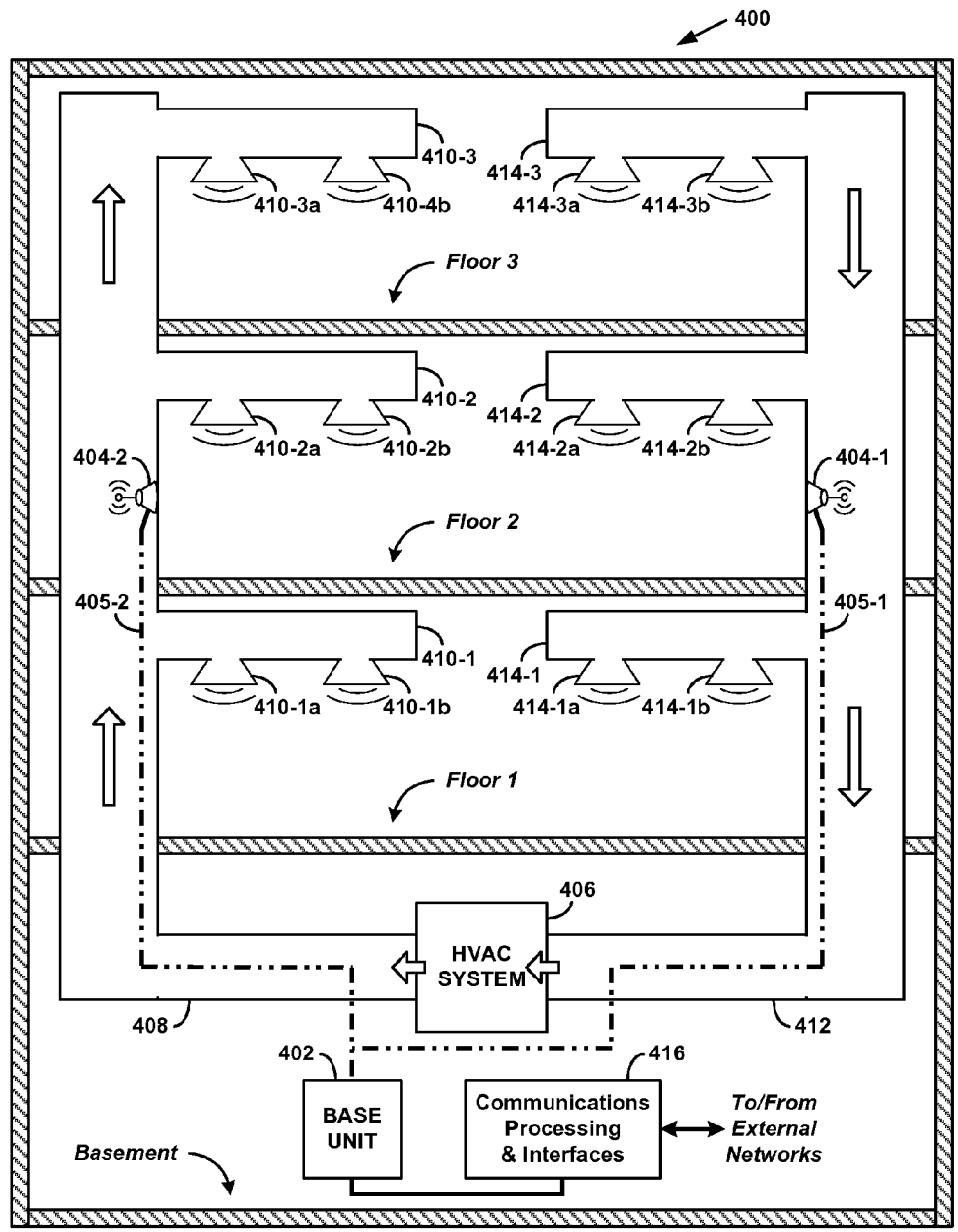
FIG. 4 illustrates in-building wireless access using an HVAC system to distribute wireless (e.g., RF) signals.

FIG. 4 illustrates a distributed antenna system that utilizes the HVAC duct system of a building to distribute RF signals. Again by way of example, a building 400 is depicted in a cut-away view as having three floors and a basement, as labeled. Also by way of example, an HVAC system 406 located in the basement is connected to a main supply duct 408 and a main return duct 412. It will be appreciated that an HVAC system comprises one or more air circulation fans or blowers, and one or more air cooling and/or heating units. The main supply duct 408 is connected to a branch supply duct 410-1 that supplies ventilation to the first floor, a branch supply duct 410-2 that supplies ventilation to the second floor, and a branch supply duct 410-3 that supplies ventilation to the third floor. Similarly, the main return duct 412 is connected to a branch return duct 414-1 that returns ventilation from the first floor, a branch supply duct 414-2 that returns ventilation from the second floor, and a branch return duct 414-3 that returns ventilation from the third floor.

In the example HVAC system shown, the branch supply duct 410-1 has supply openings (e.g., air diffusers) 410-1a and 410-1b. Similarly, the branch supply duct 410-2 has supply openings 410-2a and 410-2b, and the branch supply duct 410-3 has supply openings 410-3a and 410-3b. Also as shown, the branch return duct 414-1 has return openings (e.g., return vents) 414-1a and 414-1b, the branch return duct 414-2 has return openings 414-2a and 414-2b, and the branch return duct 414-3 has return openings 414-3a and 414-3b.

In an actual HVAC system, there may be addition main supply and return ducts, as well as many more branch ducts, and possibly a hierarchy of smaller ducts that provide widespread ventilation coverage. Furthermore, the supply and returns openings are generally placed to provide efficient delivery and return in all interior spaces (e.g. floors, offices, apartments, etc.). Because HVAC ducts are typically metallic (e.g., aluminum), they can act as transmission waveguides for RF signal. As an interconnect network of ducts that spans the interior space of a building, the HVAC duct system can serve to distribute RF signals throughout the building. Moreover, openings in the ducts can efficiently couple free-space RF signals to the network of interconnected transmission waveguides provide by the HVAC duct system. Such openings thus serve as RF access points into the waveguide system, so that the typically widespread distribution of supply and return openings yields a similarly widespread distribution of RF access points.

The HVAC system of FIG. 4 is utilized as a waveguide-based distributed antenna system by placing an antenna 404-1 in the main return duct 412 and an antenna 404-2 in the main supply duct 408. By way of example, each antenna is place just above the second floor level, about midway up the main ducts. It will be appreciated that the placements shown in the figure are illustrative, and other locations could be used. Antenna 404-1 is connected to a base unit 402 in the basement via cable 405-1, while antenna 404-2 is connected to the base unit via cable 405-2. As with the system illustrated in FIG. 3, the base unit 402 could be a DAS headend and the cables could be fiber optic connections. Alternatively, the base unit could be or a wireless access point base station, and the cables could be coaxial transmission cables. For WLAN or WiFi coverage the antennas could be integrated access points, the base unit could be a router or an Ethernet switch, and the cable could be Ethernet cables (e.g., category 5 cables).

In the HVAC system, the RF signals from a wireless device in the building 400 will couple to the HVAC duct system by one or more of the duct openings that act as RF access points, and then propagate to either or both of the antennas by way of the interconnected ducts that serve as RF waveguides. The signals received at the antennas are then communicated to the base unit 402 via the backhaul connections 405-1 and 405-2. Similarly, signals transmitted by the antennas propagate through the duct system and are emitted into free space via one or more of the openings (acting again as access points). The advantage of the HVAC-based distributed antenna system in terms of reduce infrastructure requirements is apparent. In the example, just two antennas (404-1 and 404-2) provide the same coverage as the nine depicted in the system of FIG. 3, and only two cable are required to connect the antennas to the base unit.

In practice, an HVAC-based distributed antenna system could comprise more antennas and connecting cables. However, the efficiency and/or economical gain in terms of reduced size and complexity of the infrastructure deployment compared with a traditional, high-multiplicity distributed antenna system generally holds. Consequently, a distributed antenna system based on an HVAC duct system can be a preferred mode of deployment in many instances. Note that an HVAC duct system can be more generally described as a network of interconnected transmission waveguides. The more general description may be used, for example to describe the ventilation system of structures besides buildings, such as ships and other transport vessels. The general description may apply to other structures as well.

2. LOCATION Determination Using Hvac Distribution Of Rf Signals a. Functional Principles A wireless signal transmitted by a wireless device and received at each of a plurality of antennas of a traditional distributed antenna system usually appears to the base unit (or headend) as multiple copies of the signal, but with relative time delays between them depending on the proximity of the wireless device to each antenna of the plurality. The situation is analogous to reception at a single antenna of a multipath signal; i.e., a signal that propagates along multiple paths from a source to a receiver as a result of reflections of otherwise divergent paths back toward the receiver. The base unit typically correlates and sums the signals to recover just one signal, thereby compensating for the relative time delays between the multiple paths. The correlation process also yields an arrival time of the signal at the base unit, which may correspond to the earliest arrival time among the plurality of antennas, for example. Since the relative time delays between signals received at different antennas of a distributed antenna system correspond to different distances between the wireless device (or source) and each of the antennas, the correlation process effectively integrates over the distance differences, thereby loosing or discarding the distance information.

By contrast, when a wireless signal transmitted by a wireless device is received at a plurality of base units (or headends), the correlation process at each base unit yields a distinct arrival time that can be compared with that measured at each of the other base units of the plurality. In particular, if the arrival time measured at each base unit can be related to a propagation delay between the wireless device and an antenna connected to the receiving base unit, then distances between the wireless device and the antenna can be determined. Three or more such determined distances can then be used to triangulate a location of the wireless device with respect to the antennas.

In an HVAC-based distributed antenna system that employs just one base unit, such as the one illustrated in FIG. 4, this distance information is lost in the correlation process. Accordingly, an HVAC-based distributed antenna system may be adapted to provide location of a wireless device by deploying multiple antennas that are each connected to a different base unit, such that timing information is independently preserved by each base unit and then compared in a manner that enables some form of triangulation. While such an arrangement may increase the deployment scale of an HVAC-based distributed antenna system, it may still be small compared with a traditional distributed antenna systems, and almost certainly smaller than a system comprising multiple traditional systems (with multiple base units or headends) that would be required for location determination using a traditional deployment.

In the discussion herein, the term "wireless probe" or just "probe" will be used to refer to an antenna for which independent arrival time information of detected signals can be preserved. Similarly, the terms "multi-probe" or "multiple probes" will be used to refer to multiple antennas each of which may detect the same common signal while being able to independently preserve arrival time information of the detected signal. A functional example of a probe is an antenna and an associated base unit. For this functional example, the antenna and base unit of a probe can be remotely located with respect to one another, or can be integrated. A functional example of a multi-probe system is multiple antennas each associated with a different base unit. A multi-probe system is therefore distinguished from a traditional, multiple-antenna DAS such as that illustrated in FIG. 3, or even an HVAC-based distributed antenna system with two or more antennas, such as that illustrated in FIG. 4, since the single base unit of these latter two systems integrates over the multiplicity of signal versions represented in the multiplicity of antennas. With this terminology, the HVAC-based distributed antenna system that supports location determination through a deployment of multiple antennas each associated with a different base unit is a multi-probe system.

In accordance with an example embodiment discussed below, a probe could support wireless access for a WLAN or WiFi network, or the like. Alternatively, a probe could support cellular wireless access, as for example in a CDMA-based system. In this case a probe could be associated with a cellular sector (or other form of coverage area) that is identified according to pseudo-random number (PN) offset. A multi-probe HVAC-based system in which each probe serves a different cellular sector (and is associated with a different PN offset) could be used to provide overlapping cellular wireless coverage of the different sectors throughout the interior space also served by the HVAC system for ventilation (heating and cooling).

Advantageously, the deployment of multiple, different PN-identified sectors in the HVAC-based distributed antenna system will enable location determination to be applied to cellular-based wireless devices. In particular, emergency services, including E-911, which are based on existing methods, protocols, and procedures of a CDMA-related system and its underlying infrastructure, can readily be adapted to function in conjunction with a multi-probe HVAC distributed antenna system in which the multiple probes comprise multiple, different PN-designated sectors.

As a further aspect of PN-associated probes, it can be the case that deployment of multiple sectors within a single building is not possible or desirable. For instance, it may be economically impractical or probative to do so. In this case, an HVAC-base distributed antenna system can still support cellular wireless location determination through the introduction of probes that incorporate PN beacons. As is known in the art, a PN beacon is a sector-like transceiver that provides limited sector functionality. In particular, a PN beacon provides a pilot signal and a limited set of forward and reverse link channel sufficient to support sector handoff and related signaling functions. A pilot beacon does not support user traffic channels, and consequently is less costly and complex than a fully-functional sector. However, a pilot beacon does incorporate sufficient functionality to serve as a probe for purposes of signal propagation delay determination, and hence can be incorporated in an HVAC-based distributed antenna system to support location determination. An example deployment could include one probe that serves as a fully functional sector (and which provides widespread in-building coverage via the HVAC duct system), as well as two or more additional PN-beacon probes that provide no additional user traffic support but do add location determination capability to the HVAC-base distributed antenna system.

b. Example Embodiment

Figure 5:
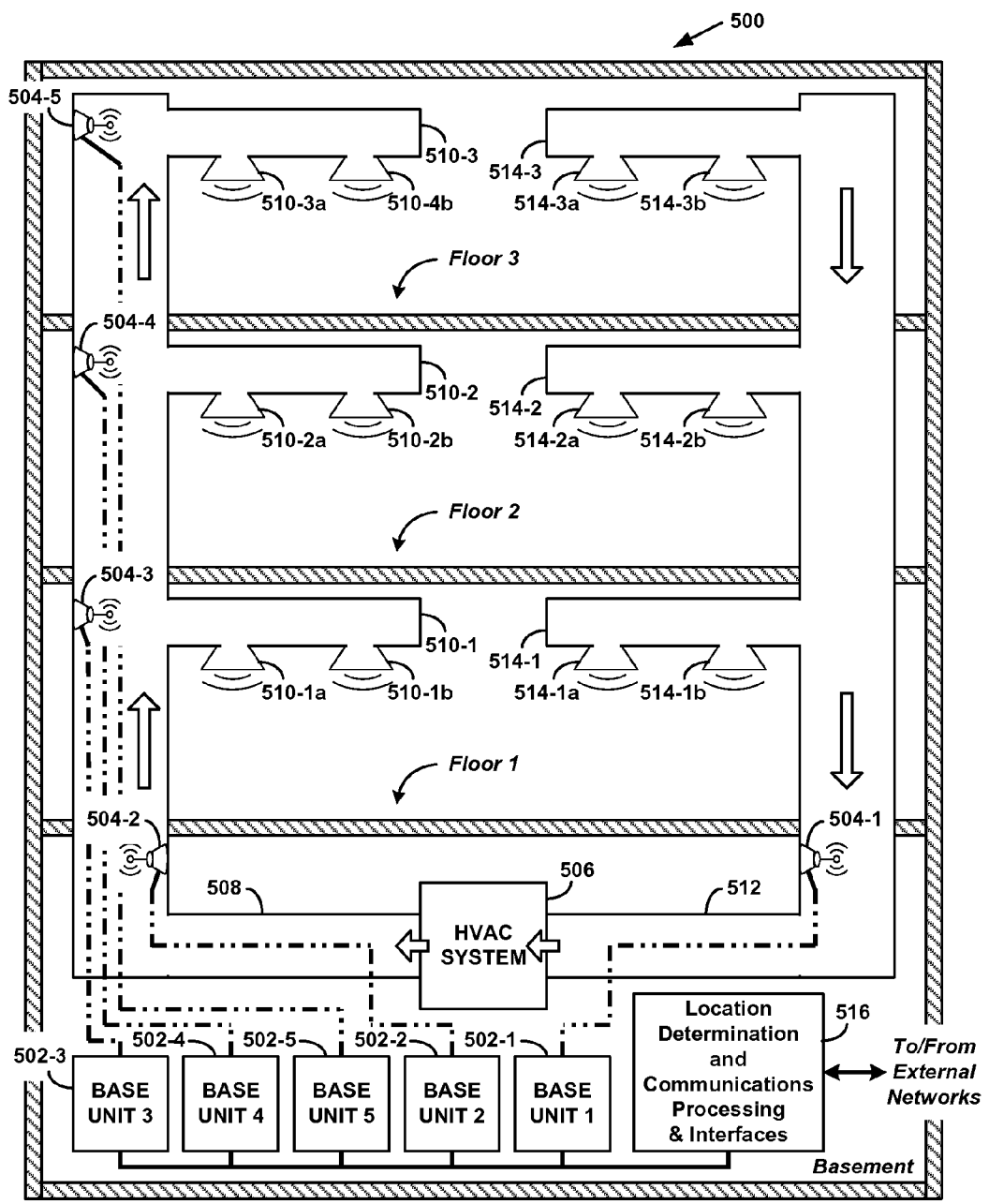
FIG. 5 illustrates in-building wireless access using an HVAC distribution of wireless (e.g., RF) signals that can be used for location determination.

FIG. 5 illustrates an example embodiment of multi-probe HVAC-based distributed antenna system that provides in-building location determination of wireless mobile devices. Again by way of example, a building 500 is depicted in a cut-away view as having three floors and a basement, as labeled. The building also includes an HVAC system 506 with main supply duct 508 and main return duct 512. A system of branch ducts and duct openings is the same as that shown for the HVAC system in FIG. 4, but with labels corresponding to FIG. 5 (e.g., branch supplies 510-1, 510-2, 510-3, etc.).

In this example embodiment, five antennas 504-1, 504-2, 504-3, 504-4, and 504-5, are each connected to respective base units 502-1, 502-2, 502-3, 502-4, and 502-5. For the sake of brevity in the figure, the cables connecting the antennas to the base units are not labeled. Since each antenna is connected to a different base unit, each antenna may be considered a different probe. In accordance with the example embodiment, the placement of the antennas (probes) is chosen so as to provide optimal spatial resolution for location determination. Thus, the antennas 504-1 and 504-2, being located at the right and left sides of the basement, provide lateral resolution between the right and left sides of the building, while the remaining antennas, being located at the first, second, and third floors, add vertical resolution to any given location determination. For example, a wireless device on the first floor can be most effectively located by triangulating with antennas 504-1, 504-2, and 504-3. Similarly, a wireless device on the second floor can be most effectively located by triangulating with antennas 504-1, 504-2, and 504-4. And so on. It will be appreciated that the locations of antennas in actual deployments may differ from what is shown in the example illustrated in FIG. 5, and the particular antenna combinations most suited for location determination may vary in any given instance depending on the position of the wireless device within the building.

In practice, a signal transmitted by a wireless mobile device may be coupled to more than one duct opening and propagate to more than one antenna. Moreover, the signal may propagate along more than one path to the same antenna, resulting in a multipath detection by that antenna. In accordance with the example embodiment, the base unit of such an antenna can compensate for such multipath detection. Thus, each base unit will independently derive an arrival time of the same signal. By compensating for propagation along to cable between the antenna and the base unit, each base unit can further reference the arrival time to an arrival time of the signal at the antenna connected to the base unit. In accordance with the example embodiment, the timing information will be passed by each detecting base unit to platform 516, which includes a location determination function. The location determination function may then compare arrival times in order to determine a location of the wireless device with respect to the detecting antennas.

The wireless signal that is used for location determination can be of various types. In accordance with the example embodiment, the signal will be suitable for determining a propagation delay between the wireless device that transmits the signal and the antennas in the HVAC duct system that detect the signal. As one example, the signal could be a part of a request-reply message sent at the same time by each base unit and returned by the wireless mobile device. Such signal could be used to determine a round-trip propagation delay between each antenna (or at least three antennas) and the wireless mobile device. Each round-trip delay would then yield a one-way delay by dividing by two (and assuming negligible motion of the device over the course of the round-trip). Another example is a wireless signal that bears a time stamp indicating the instant of transmission from the wireless mobile device. The propagation delay to any given antenna could be determined by comparing the arrival time at that antenna to the time stamp.

Yet another method of determining propagation delay is to determine the differences between the arrival times of the wireless signal at each antenna. Individual propagation delays could then be determined by simultaneously solving algebraically for each delay in terms of the computed differences in arrival times. As is known in the art, a measurement of four such arrival times can yield a unique solution for three propagation delays.

Once three propagation delays are determined by one or another of the above approaches (or other possible approaches), a location of the wireless mobile device can be determined by converting each delay into a distance or a range of distances. Three distances can be used determine a triangulation region about the three antennas. The accuracy of the triangulation can be enhanced by calibrating the relation between measured (observed) time delays and known distances and/or known locations with respect to each antenna of the HVAC-based system. Such calibration may help remove or at least reduce any inaccuracies introduced by treating the propagation paths between the wireless mobile device and the antenna as free-space paths, when each path actually includes one or more portions constrained by the HVAC ducts.

c. Example Operation

Figure 6:
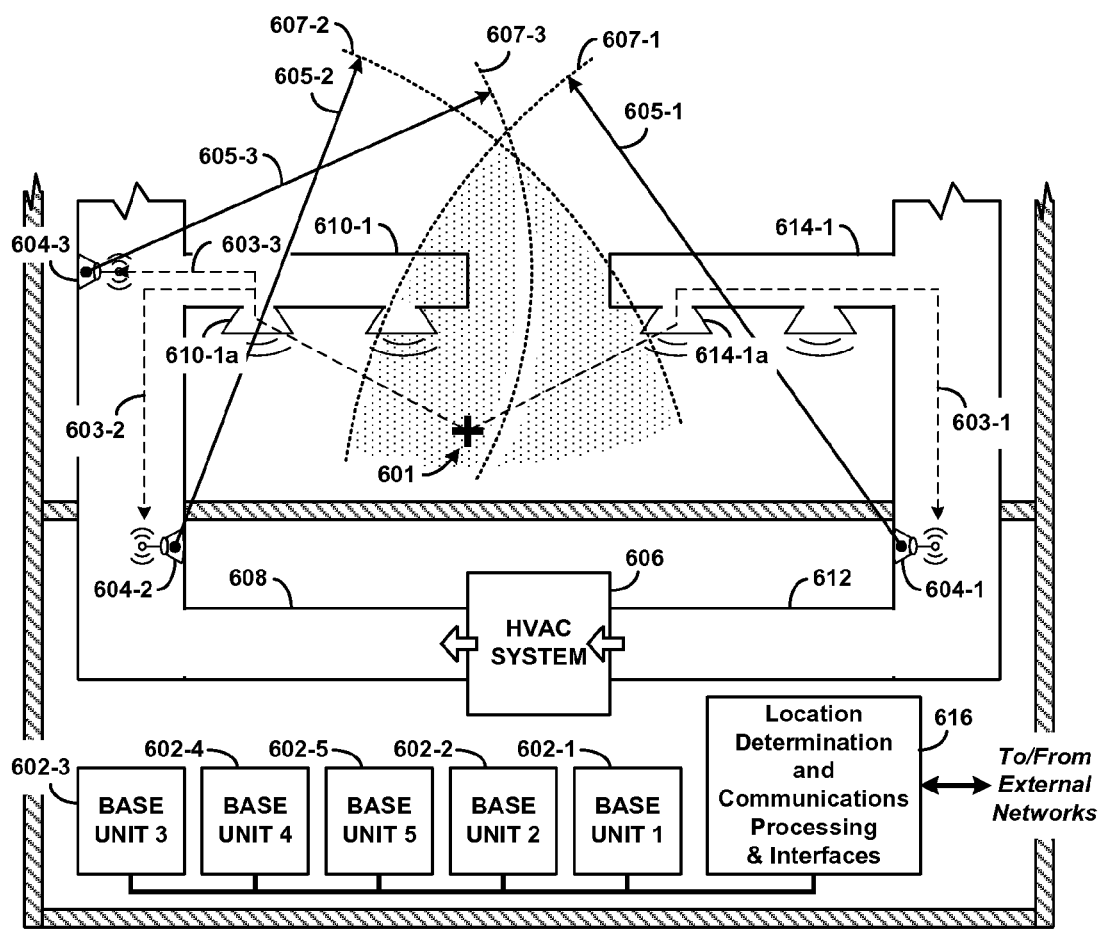
FIG. 6 illustrates an example of location determination using HVAC distribution of wireless (e.g., RF) signals within a building.

FIG. 6 illustrates example operation of an HVAC-based distributed antenna system applied to location determination. In the figure, a truncated cut-away view of just the basement and first floor of a building is shown. The label numbers again correspond to those of FIGS. 4 and 5, but begin at 600. A wireless mobile device is represented at a location 601 marked with a dark cross. A wireless signal is transmitted from the wireless device to each of three probes via three different paths. Specifically, the signal traverses path 603-1 to probe 604-1 located in the main return duct 612, path 603-2 to probe 604-2 located in the main supply duct 612 (at the basement level), and path 603-3 to probe 604-3 also located in the main return duct 612 (above the first floor). As shown, the signal traverses free space to air return vent 614-1$a$, where the signal couples to return branch duct (waveguide) 614-1 and thereafter follows the duct to the probe 604-1. Similarly, the signal also traverses free space to air return vent 610-1$a$, where the signal couples to supply branch duct (waveguide) 610-1 and thereafter follows the duct to each of probes 604-2 and 604-3.

The propagation delays of each path (between the wireless mobile device and the antenna of each probe) are determined by the associated base units 602-1, 602-2, and 602-3 (connecting cables have been omitted from the figure for the sake of brevity). Each delay is converted to a respective radial distance 605-1, 605-2, and 605-3, by multiplying by the speed of light. Each respective radial distance then defines a respective shell (depicted as a dotted arc segment) 607-1, 607-2, and 607-3 about each respective probe. The triangulation region of the three shells is shown as a stippled region enclosed by the shells. The location 601 is seen to lie within the region.

In the example operation just described, each path 603-1, 603-2, and 603-3 is treated as a free-space path from the respective probe. As a result, the radial distances over-estimate the true distances between the probes and the wireless device. Consequently, the triangulation region does not constrain the determined location as well as true free-space paths would. To help improve the accuracy of the distance determination, test measurements of propagation delays to each probe from known locations in the building may be tabulated and stored in a database or other formatted data structure associated with the location determination function 616. For instance a look-up table could be generated from measurements and then stored in machine readable media (e.g., magnetic memory, solid state memory, etc.). During operation to determine an unknown location from a received wireless signal, the look-up table could be consulted. The table could thereby provide a calibrated determination of distance from observed propagation delay.

FIG. 7 shows three forms of look-up tables that could be used in the example embodiment. The table 702 in FIG. 7($a$) represents a simple association of ranges of propagation delays with ranges of distances for each probe of a multi-probe HVAC-base system. For purposes of illustration, only information for two probes is displayed, with only a partial tabulation for each probe being listed; horizontal and vertical ellipses represent extension of the table to additional probes and additional tabulated values, respectively. The tabulation for each probe comprises a first column of propagation delay ranges labeled "ΔT Range" and a corresponding column of associated distance ranges labeled "Distance Range." By way of example, the propagation delays are given in microseconds (μ-sec) and the distances are given in meters.

The values in the table represent examples, and should not be viewed as limiting with respect the present invention or embodiments thereof. In accordance with the example embodiment, actual values would be determined by taking test measurements at various, known locations throughout the building in which the HVAC-based system is deployed. For instance, a test wireless mobile device could be used to transmit test wireless signals at each of the various, known locations. At each of the various, known locations, the test wireless signal could include information indicative of the location. As the test signals are transmitted, a data collection program executing on platforms 516 or 616 or the like could acquire the timing and location information from each probe, and thereby generate the tabulation.

Operationally, the table 702 could be stored in a database or other form of computer-readable storage associated with platforms 516 or 616 or the like. The table could then be used to determine a distance range for a given, observed propagation delay of a wireless signal received at a probe from a wireless mobile device at an a priori unknown location within the building. For instance, according the example values in the table 702, a propagation delay of 33 μ-sec determined at probe no. 1 would correspond to a distance in a range of 0-20 meters from the probe. Similarly, a propagation delay of 91 μ-sec determined at probe no. 2 would correspond to a distance in a range of 20-60 meters from the probe. With such determination for each of three or more probes, a region of overlap relative to the three or more probes could thereby be determined, such that the a priori unknown location of the wireless mobile device would be deduced to be within that region.

FIG. 7(*b*) illustrates a table 704 that could be used for in-building location determination in a multi-probe HVAC-based system deployed for in-building cellular wireless communications. As described above, each probe of such a system would correspond to a different cellular sector with a different designated pseudo-random number (PN) offset. The table 704 comprises largely the same format as table 702, except that the probes are signified according to sector PN offsets; "Sector PN 64" and "Sector PN 256" in the example of FIG. 7(*b*). Again, the horizontal and vertical ellipses represent extension of the table to additional probes (sector PNs) and additional tabulated values, respectively. The columns under each sector PN contain the same information (but possibly different values) as those under the probe numbers in table 702. As with table 702, the values in table 704 are illustrative. Actual values would be determined according to calibrating measurements and stored in a database in a manner similar to that described for table 702.

Operationally, propagation delay information acquired by PN-based probes can be provided to the cellular network for processing according to existing protocols and procedures for location-based services. For example, at the start of an emergency call (i.e., E-911 call), a reply to message initially sent from each of multiple sectors to the caller's mobile device is used by each sector to determine a round-trip delay, and hence a distance from each sector to the mobile device. In an HVAC-based system comprising PN-based probes, the delays can be determined as described above, and table 704 consulted to determine the distance range from each probe. This information can be passed to the serving MSC or other RAN element to which the HVAC-base system connects (e.g., via interfaces in platform 616 or the like). Alternatively, the platform 616 could determine the overlapping region in which the caller is located, and provide that information to the cellular network. The cellular network can then engage an appropriate PSAP and/or other emergency services entities to respond to the call at the caller's determined location. It will be appreciated that other cellular location-based services can be similarly supported.

The accuracy of location determination can be further enhanced by including signal strength information in addition to timing information. In accordance with the example embodiment, each probe will be able to determine a strength of a wireless signal transmitted by a wireless device. For instance, a wireless device may transmit a reverse signal strength indicator (RSSI). FIG. 7(*c*) illustrates a table 706 that includes signal strength information as well propagation delay information in order to determine a look-up-based distanced range from observed data. In particular, for each probe, each tabulated distance range is associated with both a range of propagation delays and a power level range (the power level range is implicit; namely, any two consecutive values in a column define a range between those values). By way of example, the power levels are specified in decibels (dB). As with tables 702 and 704, the values in table 706 are illustrative, and the ellipses represent additional probes and tabulated data. Actual values would be determined according to calibrating measurements and stored in a manner similar to that described for the other two tables, but with the addition of measuring and recording power levels with each calibration observation.

Operationally, table 706 would be consulted in a manner similar to that described above for table 702. For example, instance, according the example values in the table 706, a propagation delay of 33 μ-sec and a signal strength of −35.0 dB determined at probe no. 1 would correspond to a distance in a range of 15-25 meters from the probe. Similarly, a propagation delay of 33 μ-sec and a signal strength of −8.5 dB determined at probe no. 1 would correspond to a distance in a range of 0-14 meters from the probe. Again, with three distance determination from three probes, an overlap region containing the location of the wireless device could be determined.

The tables shown in FIG. 7(*a,b,c*) are illustrations, and not intended to be limiting with respect to the present invention or embodiments thereof. For example, another form of look-up table could be a database containing for each probe an association of propagation delay ranges with specific sets location coordinates in the building. For instance, each set could be (x,y,z) coordinates with respect to a defined origin. A given delay for a given probe could correspond to more than one set of coordinates. However, with three delay values for three probes, a most likely set of coordinates for each probe could be determined such that the location of the wireless device is well-specified. As with the examples in FIG. 7, such a coordinate table could be generated using measurements. Other forms of tables and combinations of data could be used as well to enhance the accuracy of location determination in an HVAC-based distributed antenna system.

d. Example Platform

Figure 8:
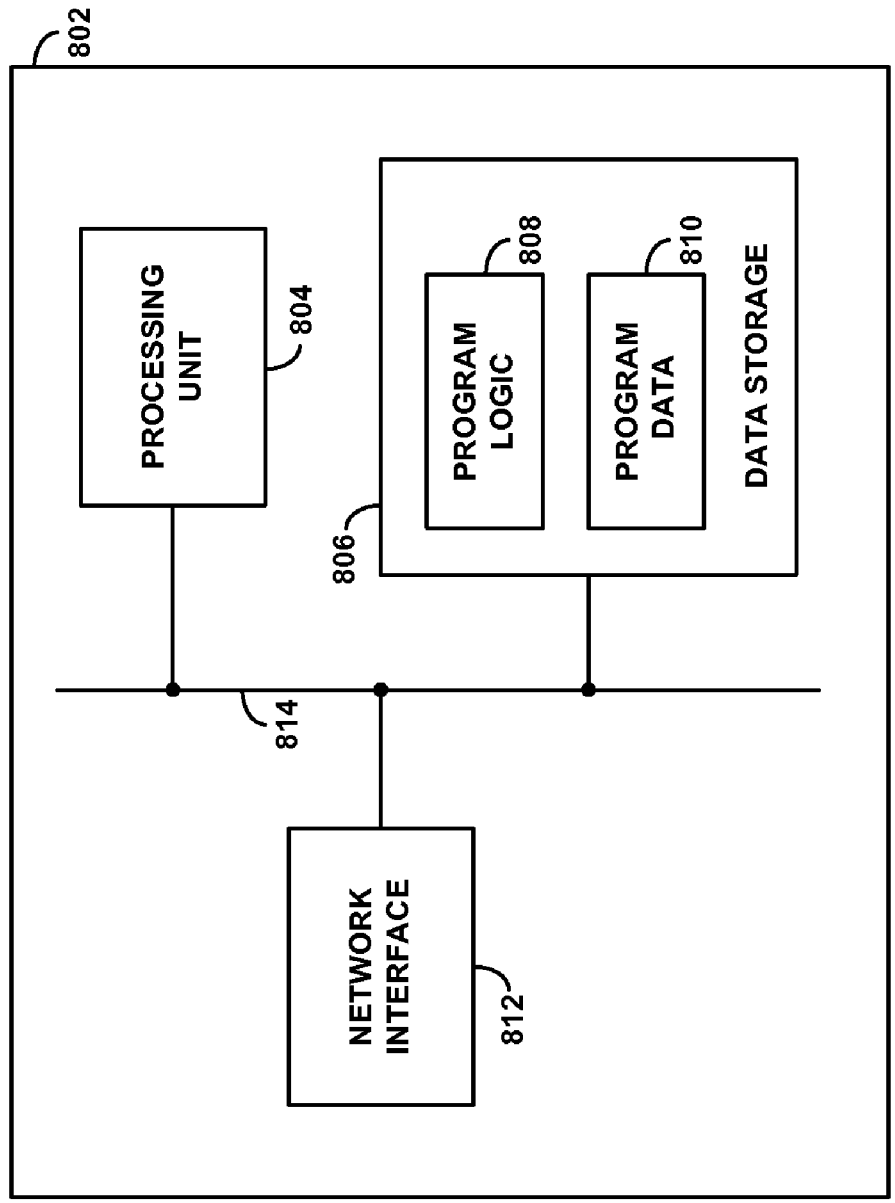
FIG. 8 is an example block diagram of a computing platform that can carry out location determination in conjunction with an HVAC-based distributed antenna system.

FIG. 8 is a simplified block diagram depicting functional components of an example platform 802 in which certain processing functions of location determination in an HVAC-based distributed antenna system may be implemented. As shown in FIG. 8, the example platform 802, representative of platform 516 FIG. 5 for instance, includes a network interface 812, a processing unit 804, and data storage 806, all of which may be coupled together by a system bus 814 or other mechanism. In addition, the platform may also include external storage, such as magnetic or optical disk storage, although this is not shown in FIG. 8. These components may be arranged to support communication processing, interface communication functions with external networks, and location determination as described herein.

Network interface 812 enables communication with external networks, such network 200 in FIG. 2. As such, network interface 806 may take the form of a connection to a trunk or optical link to a BSC, a TDM switch such as MSC 308. Alternatively or additionally, interface 812 could be an Ethernet network interface card or other physical connection that can be coupled with PCF 314, for instance. Network interface 812 may also provide connections to probes and/or base units, such as those illustrated in FIGS. 5 and 6.

Processing unit 804 comprises one or more general-purpose processors (e.g., INTEL microprocessors) and/or one or more special-purpose processors (e.g., dedicated digital signal processor, application specific integrated circuit, etc.). In turn, the data storage 806 comprises one or more volatile and/or non-volatile storage components, such as magnetic or optical memory or disk storage. Data storage 806 can be integrated in whole or in part with processing unit 804, as cache memory or registers for instance. As further shown, data storage 804 is equipped to hold program logic 808 and program data 810.

Program logic 808 may comprise machine language instructions that define routines executable by processing unit 804 to carry out various functions described herein. For instance, propagation delays from three more probes may be received via network interface 812 and thereafter process by processing unit 804 according to instructions stored in program logic 808 in order to determine a location of a wireless mobile device in a manner described above. Moreover, one or more programs executed by processing unit 804 according to instructions stored in program logic 808 could use the determined location available to deliver or support a location-based service. For instance, such programs could provide asset tracking functionality using locations determined by the location-determination instructions. Other services could be provided as well.

It will be appreciated that there can be numerous specific implementations of a computing platform for determining location in an HVAC-based distributed antenna system, such platform 802 illustrated in FIG. 8. Further, one of skill in the art would understand how to devise and build such an implementation. As such, platform 802 is representative of means for carrying out location determination in an HVAC-based distributed antenna system with the methods and steps described herein by way of example. It will be further appreciated that the method steps carried by the platform for the described purposes can be stored as computer-readable instructions on tangible computer-readable media.

3. Conclusion

An example of an embodiment of the present invention has been described above. Those skilled in the art will understand, however, that changes and modifications may be made to the embodiment described without departing from the true scope and spirit of the invention, which is defined by the claims.

What is claimed:

1. A method of providing a location of a wireless mobile device within a building structure to a cellular network, the method comprising:

at each pseudo-random number (PN) based probe of a plurality of PN-based probes respectively located within one or more ventilation ducts of an HVAC system of the building structure, each PN-based probe having a distinct PN offset and being communicatively coupled with the cellular network, receiving a common wireless signal transmitted from the wireless mobile device;

determining a respective distance between the wireless mobile device and each respective PN-based probe based on a respective propagation delay of the common wireless signal received at the respective PN-based probe; and transmitting information indicative of each respective distance to the cellular network, wherein determining the respective distance between the wireless mobile device and each respective PN-based probe based on the respective propagation delay of the common wireless signal received at the respective PN-based probe comprises:

for each respective PN-based probe of the plurality of PN-based probes, determining a respective radial distance based on the respective propagation delay, wherein the respective radial distance corresponds to a sum of a free-space path between the wireless mobile device and an opening in a ventilation duct of the HVAC system and a waveguide path within the HVAC system between the opening and the respective PN-based probe;

defining a respective radial shell about each respective PN-based probe based on the respective radial distance determined for the respective PN-based probe, and determining a region of overlap of all the respective radial shells;

determining a measured location of the wireless mobile device to be within the region of overlap; and for each respective PN-based probe of the plurality of PN-based probes, determining the respective distance between the wireless mobile device and the respective PN-based probe as a free-space distance from the respective PN-based probe to the measured location of the wireless mobile device.

2. The method of claim 1, wherein the cellular network operates according to a CDMA family of protocols, and wherein a first PN-based probe of the plurality of PN-based probes supports full forward-link and full-reverse link communications in a sector of the cellular network.

3. The method of claim 2, wherein a second PN-based probe of the plurality of PN-based probes is a pilot beacon configured to operate in the cellular network.

4. The method of claim 1, wherein determining the respective radial distance based on the respective propagation delay for each respective PN-based probe comprises: for each respective PN-based probe, performing a table lookup to correlate the respective propagation delay with a calibrated distance from the respective PN-based probe.

5. The method of claim 1, wherein determining the respective radial distance based on the respective propagation delay for each respective PN-based probe comprises: for each respective PN-based probe, performing a table lookup to correlate both the respective propagation delay and a received signal power level with a calibrated distance from the respective PN-based probe.

6. The method of claim 1, wherein transmitting information indicative of each respective distance to the cellular network comprises transmitting the measured location of the mobile device to the cellular network.

7. The method of claim 1, wherein transmitting information indicative of each respective distance to the cellular network comprises transmitting from each respective PN-based probe information indicative of the respective propagation delay of the common wireless signal received at the respective PN-based probe.

8. The method of claim 1, wherein the common wireless signal transmitted from the wireless mobile device comprises signaling that is part of an E-911 call.

9. A system providing a location of a wireless mobile device within a building structure to a cellular network, the system comprising:
- a plurality of pseudo-random number (PN) based probes each being respectively located within one or more ventilation ducts of an HVAC system of the building structure, each PN-based probe having a distinct PN offset and each being communicatively coupled with the cellular network;
- means for receiving at each respective PN-based probe of the plurality of PN-based probes a common wireless signal transmitted from the wireless mobile device;
- means for determining a respective distance between the wireless mobile device and each respective PN-based probe based on a respective propagation delay of the common wireless signal received at the respective PN-based probe; and
- means for transmitting information indicative of each respective distance to the cellular network,
- wherein determining the respective distance between the wireless mobile device and each respective PN-based probe based on the respective propagation delay of the common wireless signal received at the respective PN-based probe comprises:
- for each respective PN-based probe of the plurality of PN-based probes, determining a respective radial distance based on the respective propagation delay, wherein the respective radial distance corresponds to a sum of a free-space path between the wireless mobile device and an opening in a ventilation duct of the HVAC system and a waveguide path within the HVAC system between the opening and the respective PN-based probe;
- defining a respective radial shell about each respective PN-based probe based on the respective radial distance determined for the respective PN-based probe, and determining a region of overlap of all the respective radial shells;
- determining a measured location of the wireless mobile device to be within the region of overlap; and
- for each respective PN-based probe of the plurality of PN-based probes, determining the respective distance between the wireless mobile device and the respective PN-based probe as a free-space distance from the respective PN-based probe to the measured location of the wireless mobile device.

10. The system of claim 9, wherein the cellular network is configured to operate according to a CDMA family of protocols,
- and wherein a first PN-based probe of the plurality of PN-based probes is configured to support full forward-link and full-reverse link communications in a sector of the cellular network.

11. The system of claim 10, wherein a second PN-based probe of the plurality of PN-based probes is a pilot beacon configured to operate in the cellular network.

12. The system of claim 9, wherein determining the respective radial distance based on the respective propagation delay for each respective PN-based probe comprises: for each respective PN-based probe, performing a table lookup to correlate the respective propagation delay with a calibrated distance from the respective PN-based probe.

13. The system of claim 9, wherein determining the respective radial distance based on the respective propagation delay for each respective PN-based probe comprises: for each respective PN-based probe, performing a table lookup to correlate both the respective propagation delay and a received signal power level with a calibrated distance from the respective PN-based probe.

14. The system of claim 9, wherein means for transmitting information indicative of each respective distance to the cellular network comprises means for transmitting the measured location of the mobile device to the cellular network.

15. The system of claim 9, wherein means for transmitting information indicative of each respective distance to the cellular network comprises means for transmitting from each respective PN-based probe information indicative of the respective propagation delay of the common wireless signal received at the respective PN-based probe.

16. The system of claim 9, wherein the common wireless signal transmitted from the wireless mobile device comprises signaling that is part of an E-911 call.

17. A tangible non-transitory computer-readable medium having stored thereon computer-executable instructions that, upon execution by a computing device, cause the computing device to perform a method comprising:
- processing a common wireless signal received at each pseudo-random number (PN) based probe of a plurality of PN-based probes respectively located within one or more ventilation ducts of an HVAC system of a building structure, wherein the common wireless signal is transmitted by a wireless communication device, and wherein each PN-based probe has a distinct PN offset and is communicatively coupled with a cellular network;
- determining a respective distance between the wireless mobile device and each respective PN-based probe based on a respective propagation delay of the common wireless signal received at the respective PN-based probe; and
- causing transmission of information indicative of each respective distance to a cellular network,
- wherein determining the respective distance between the wireless mobile device and each respective PN-based probe based on the respective propagation delay of the common wireless signal received at the respective PN-based probe comprises:
- for each respective PN-based probe of the plurality of PN-based probes, determining a respective radial distance based on the respective propagation delay, wherein the respective radial distance corresponds to a sum of a free-space path between the wireless mobile device and an opening in a ventilation duct of the HVAC system and a waveguide path within the HVAC system between the opening and the respective PN-based probe;
- defining a respective radial shell about each respective PN-based probe based on the respective radial distance determined for the respective PN-based probe, and determining a region of overlap of all the respective radial shells;
- determining a measured location of the wireless mobile device to be within the region of overlap; and
- for each respective PN-based probe of the plurality of PN-based probes, determining the respective distance between the wireless mobile device and the respective PN-based probe as a free-space distance from the respective PN-based probe to the measured location of the wireless mobile device.

18. The tangible non-transitory computer-readable medium of claim 17, wherein the cellular network is configured to operate according to a CDMA family of protocols,
and wherein a first PN-based probe of the plurality of PN-based probes is configured to support full forward-link and full-reverse link communications in a sector of the cellular network.

19. The tangible non-transitory computer-readable medium of claim 18, wherein a second PN-based probe of the plurality of PN-based probes is a pilot beacon configured to operate in the cellular network.

20. The tangible non-transitory computer-readable medium of claim 17, wherein determining the respective radial distance based on the respective propagation delay for each respective PN-based probe comprises: for each respective PN-based probe, performing a table lookup to correlate the respective propagation delay with a calibrated distance from the respective PN-based probe.

21. The tangible non-transitory computer-readable medium of claim 17, wherein determining the respective radial distance based on the respective propagation delay for each respective PN-based probe comprises: for each respective PN-based probe, performing a table lookup to correlate both the respective propagation delay and a received signal power level with a calibrated distance from the respective PN-based probe.

22. The tangible non-transitory computer-readable medium of claim 17, wherein causing transmission of information indicative of each respective distance to the cellular network comprises causing transmission of the measured location of the mobile device to the cellular network.

23. The tangible non-transitory computer-readable medium of claim 17, wherein causing transmission of information indicative of each respective distance to the cellular network comprises causing transmission from each respective PN-based probe information indicative of the respective propagation delay of the common wireless signal received at the respective PN-based probe.

24. The tangible non-transitory computer-readable medium of claim 17, wherein the common wireless signal transmitted from the wireless mobile device comprises signaling that is part of an E-911 call.

25. A method of providing a location of a wireless mobile device within a building structure to a cellular network, the method comprising:
at each location-specific probe of a plurality of location-specific probes respectively located within one or more ventilation ducts of an HVAC system of the building structure, each location-specific probe being associated with a distinct sector of the cellular network and being communicatively coupled with the cellular network, receiving a common wireless signal transmitted from the wireless mobile device;
determining a respective distance between the wireless mobile device and each respective location-specific probe based on a respective propagation delay of the common wireless signal received at the respective location-specific probe; and
transmitting information indicative of each respective distance to the cellular network,
wherein determining the respective distance between the wireless mobile device and each respective location-specific probe based on the respective propagation delay of the common wireless signal received at the respective location-specific probe comprises:
for each respective location-specific probe of the plurality of location-specific probes, determining a respective radial distance based on the respective propagation delay, wherein the respective radial distance corresponds to a sum of a free-space path between the wireless mobile device and an opening in a ventilation duct of the HVAC system and a waveguide path within the HVAC system between the opening and the respective location-specific probe;
defining a respective radial shell about each respective location-specific probe based on the respective radial distance determined for the respective location-specific probe, and determining a region of overlap of all the respective radial shells;
determining a measured location of the wireless mobile device to be within the region of overlap; and
for each respective location-specific probe of the plurality of location-specific probes, determining the respective distance between the wireless mobile device and the respective location-specific probe as a free-space distance from the respective location-specific probe to the measured location of the wireless mobile device.

26. The method of claim 25, wherein the cellular network operates according to a CDMA family of protocols,
and wherein a first location-specific probe of the plurality of location-specific probes supports full forward-link and full-reverse link communications in a sector of the cellular network.

27. The method of claim 26, wherein a second location-specific probe of the plurality of location-specific probes is a pilot beacon configured to operate in the cellular network.

28. The method of claim 25, wherein determining the respective radial distance based on the respective propagation delay for each respective location-specific probe comprises: for each respective location-specific probe, performing a table lookup to correlate the respective propagation delay with a calibrated distance from the respective location-specific probe.

29. The method of claim 25, wherein determining the respective radial distance based on the respective propagation delay for each respective location-specific probe comprises: for each respective location-specific probe, performing a table lookup to correlate both the respective propagation delay and a received signal power level with a calibrated distance from the respective location-specific probe.

30. The method of claim 25, wherein transmitting information indicative of each respective distance to the cellular network comprises transmitting the measured location of the mobile device to the cellular network.

31. The method of claim 25, wherein transmitting information indicative of each respective distance to the cellular network comprises transmitting from each respective location-specific probe information indicative of the respective propagation delay of the common wireless signal received at the respective location-specific probe.

32. The method of claim 25, wherein the common wireless signal transmitted from the wireless mobile device comprises signaling that is part of an E-911 call.

33. A system providing a location of a wireless mobile device within a building structure to a cellular network, the system comprising:
a plurality of location-specific probes each being respectively located within one or more ventilation ducts of an HVAC system of the building structure, each location-specific probe being associated with a distinct sector of the cellular network and each being communicatively coupled with the cellular network;

means for receiving at each respective location-specific probe of the plurality of location-specific probes a common wireless signal transmitted from the wireless mobile device;
means for determining a respective distance between the wireless mobile device and each respective location-specific probe based on a respective propagation delay of the common wireless signal received at the respective location-specific probe; and
means for transmitting information indicative of each respective distance to the cellular network,
wherein determining the respective distance between the wireless mobile device and each respective location-specific probe based on the respective propagation delay of the common wireless signal received at the respective location-specific probe comprises:
for each respective location-specific probe of the plurality of location-specific probes, determining a respective radial distance based on the respective propagation delay, wherein the respective radial distance corresponds to a sum of a free-space path between the wireless mobile device and an opening in a ventilation duct of the HVAC system and a waveguide path within the HVAC system between the opening and the respective location-specific probe;
defining a respective radial shell about each respective location-specific probe based on the respective radial distance determined for the respective location-specific probe, and determining a region of overlap of all the respective radial shells;
determining a measured location of the wireless mobile device to be within the region of overlap; and
for each respective location-specific probe of the plurality of location-specific probes, determining the respective distance between the wireless mobile device and the respective location-specific probe as a free-space distance from the respective location-specific probe to the measured location of the wireless mobile device.

34. The system of claim 33, wherein the cellular network is configured to operate according to a CDMA family of protocols,
and wherein a first location-specific probe of the plurality of location-specific probes is configured to support full forward-link and full-reverse link communications in a sector of the cellular network.

35. The system of claim 34, wherein a second location-specific probe of the plurality of location-specific probes is a pilot beacon configured to operate in the cellular network.

36. The system of claim 33, wherein determining the respective radial distance based on the respective propagation delay for each respective location-specific probe comprises:
for each respective location-specific probe, performing a table lookup to correlate the respective propagation delay with a calibrated distance from the respective location-specific probe.

37. The system of claim 33, wherein determining the respective radial distance based on the respective propagation delay for each respective location-specific probe comprises:
for each respective location-specific probe, performing a table lookup to correlate both the respective propagation delay and a received signal power level with a calibrated distance from the respective location-specific probe.

38. The system of claim 33, wherein means for transmitting information indicative of each respective distance to the cellular network comprises means for transmitting the measured location of the mobile device to the cellular network.

39. The system of claim 33, wherein means for transmitting information indicative of each respective distance to the cellular network comprises means for transmitting from each respective location-specific probe information indicative of the respective propagation delay of the common wireless signal received at the respective location-specific probe.

40. The system of claim 33, wherein the common wireless signal transmitted from the wireless mobile device comprises signaling that is part of an E-911 call.

41. A tangible non-transitory computer-readable medium having stored thereon computer-executable instructions that, upon execution by a computing device, cause the computing device to perform a method comprising:
processing a common wireless signal received at each location-specific probe of a plurality of location-specific probes respectively located within one or more ventilation ducts of an HVAC system of a building structure, wherein the common wireless signal is transmitted by a wireless communication device, and wherein each location-specific probe is associated with a distinct sector of a cellular network and is communicatively coupled with the cellular network;
determining a respective distance between the wireless mobile device and each respective location-specific probe based on a respective propagation delay of the common wireless signal received at the respective location-specific probe; and
causing transmission of information indicative of each respective distance to a cellular network,
wherein determining the respective distance between the wireless mobile device and each respective location-specific probe based on the respective propagation delay of the common wireless signal received at the respective location-specific probe comprises:
for each respective location-specific probe of the plurality of location-specific probes, determining a respective radial distance based on the respective propagation delay, wherein the respective radial distance corresponds to a sum of a free-space path between the wireless mobile device and an opening in a ventilation duct of the HVAC system and a waveguide path within the HVAC system between the opening and the respective location-specific probe;
defining a respective radial shell about each respective location-specific probe based on the respective radial distance determined for the respective location-specific probe, and determining a region of overlap of all the respective radial shells;
determining a measured location of the wireless mobile device to be within the region of overlap; and
for each respective location-specific probe of the plurality of location-specific probes, determining the respective distance between the wireless mobile device and the respective location-specific probe as a free-space distance from the respective location-specific probe to the measured location of the wireless mobile device.

42. The tangible non-transitory computer-readable medium of claim 41, wherein the cellular network is configured to operate according to a CDMA family of protocols,
and wherein a first location-specific probe of the plurality of location-specific probes is configured to support full forward-link and full-reverse link communications in a sector of the cellular network.

43. The tangible non-transitory computer-readable medium of claim 42, wherein a second location-specific probe of the plurality of location-specific probes is a pilot beacon configured to operate in the cellular network.

44. The tangible non-transitory computer-readable medium of claim 41, wherein determining the respective radial distance based on the respective propagation delay for each respective location-specific probe comprises: for each respective location-specific probe, performing a table lookup to correlate the respective propagation delay with a calibrated distance from the respective location-specific probe.

45. The tangible non-transitory computer-readable medium of claim 41, wherein determining the respective radial distance based on the respective propagation delay for each respective location-specific probe comprises: for each respective location-specific probe, performing a table lookup to correlate both the respective propagation delay and a received signal power level with a calibrated distance from the respective location-specific probe.

46. The tangible non-transitory computer-readable medium of claim 41, wherein causing transmission of information indicative of each respective distance to the cellular network comprises causing transmission of the measured location of the mobile device to the cellular network.

47. The tangible non-transitory computer-readable medium of claim 41, wherein causing transmission of information indicative of each respective distance to the cellular network comprises causing transmission from each respective location-specific probe information indicative of the respective propagation delay of the common wireless signal received at the respective location-specific probe.

48. The tangible non-transitory computer-readable medium of claim 41, wherein the common wireless signal transmitted from the wireless mobile device comprises signaling that is part of an E-911 call.

* * * * *